2 Sheets—Sheet 1.

A. V. CALLAHAN.
Cooking-Stove.

No. 196,191. Patented Oct. 16, 1877.

Witnesses
Richard L. Gardiner
Harry Smith

Inventor
Andrew V. Callahan
by his Attorneys
Howson and Son

2 Sheets—Sheet 2.

A. V. CALLAHAN.
Cooking-Stove.

No. 196,191. Patented Oct. 16, 1877.

Witnesses
Richard L. Gardiner
Harry Smith

Inventor
Andrew V. Callahan
by his Attorneys
Howson and Son

UNITED STATES PATENT OFFICE.

ANDREW V. CALLAHAN, OF PHILADELPHIA, PENNSYLVANIA.

IMPROVEMENT IN COOKING-STOVES.

Specification forming part of Letters Patent No. 196,191, dated October 16, 1877; application filed January 25, 1877.

*To all whom it may concern:*

Be it known that I, ANDREW V. CALLAHAN, of Philadelphia, Pennsylvania, have invented a new and useful Improvement in Stoves, of which the following is a specification:

The objects of my invention are to so construct a cooking-stove that an effective water-heater may be combined with the stove and extended facilities afforded for the drying of clothes.

Figure 1:
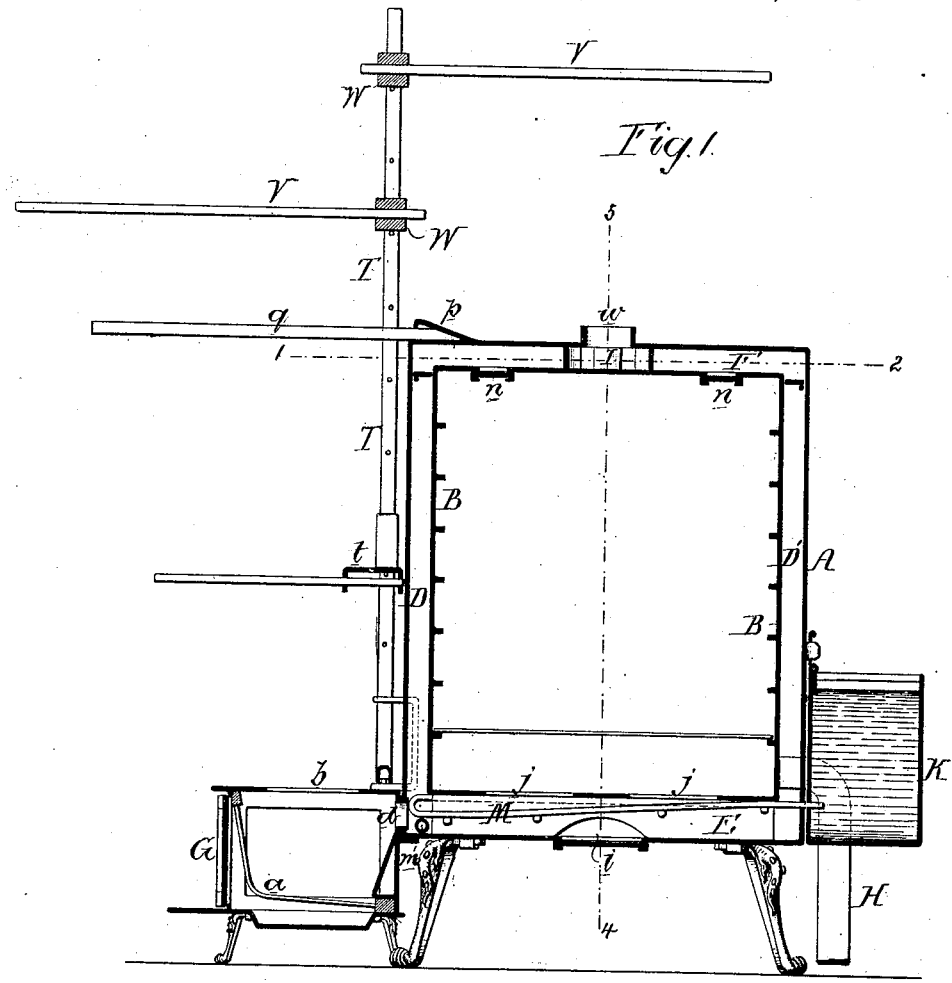
Figure 2:
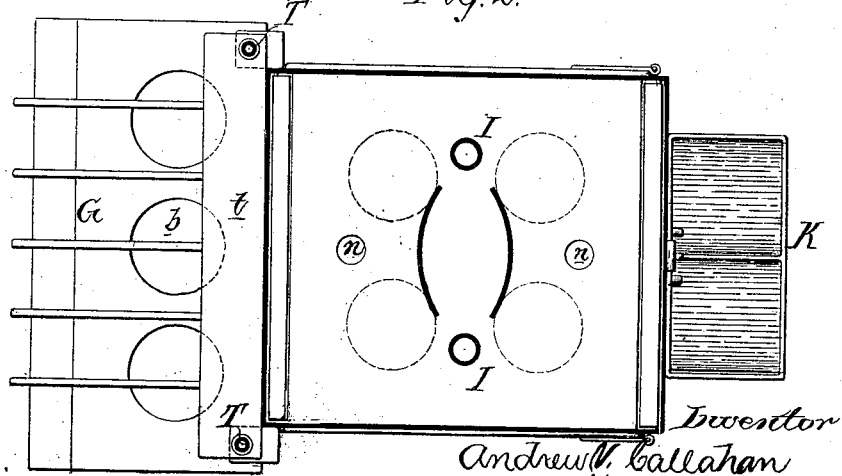
Figure 3:
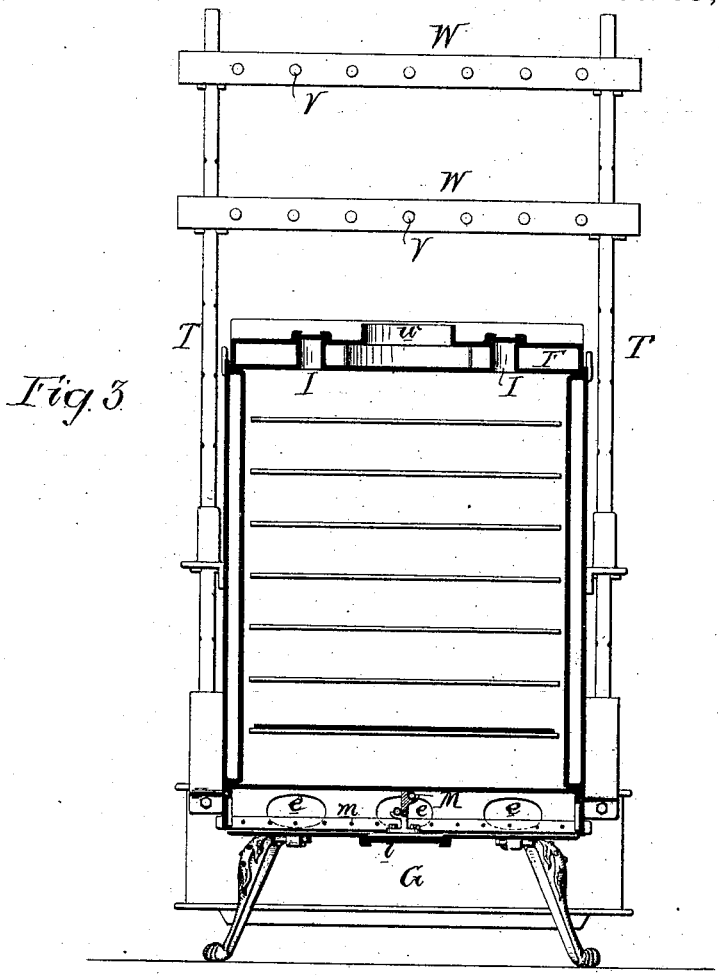

In the accompanying drawing, Figure 1, Sheet 1, is a vertical section of my improved stove and baking or drying oven and clothes-drying appliances; Fig. 2, Sheet 1, a sectional plan on the line 1 2; and Fig. 3, Sheet 2, a transverse vertical section on the line 3 4 of Fig. 1.

The baking or drying oven, which is made separable from the stove, consists of the outer casing A and inner casing B, and between these casings are the vertical flues D D', lower horizontal flue E, and upper horizontal flue F, all communicating with the outlet $w$, in a manner which needs no description.

G is the fire-place proper or furnace, and contains the usual grate $a$, and has in its top plate the ordinary boiler-holes $b$. At the rear of the fire-place are outlet branches $d$, three in the present instance, and these branches are adapted to openings $e$ in the outer casing of the stove, directly opposite the lower flue E of the oven.

It should here be understood that my improved stove has been designed more especially for use in the Southern and Southwestern States; that the two main parts—namely, the oven and the fire-place—are intended to be used either separately or together, as circumstances may suggest. For instance, the furnace detached from the oven may be placed in the usual open fire-place common in the above sections of the country, and may be there employed for heating or cooking purposes when there is no use for a baking or drying oven.

In the summer months, on the other hand, when the process of baking or of drying fruit, &c., has to be conducted, and the heat of a stove in the dwelling would be objectionable, the oven detached from the stove may be used in any outbuilding, or even in the open air, by lighting a wood fire in the lower flue E, which is made of sufficient capacity for the purpose, the wood being introduced into this flue through the openings $e$, or through openings at the sides of the flue. The plate beneath the flue E is provided with a dampered opening, $i$, which can be adapted to an ordinary heating-stove, so that the oven may be used as a radiating and air-heating drum, and in the bottom plate of the oven are formed boiler-holes $j$, whereby the oven, when used alone, is adapted for cooking as well as for baking or drying.

In many cases, however, it will be best to use the furnace and oven in connection with each other, as shown in the drawing. When the oven thus connected to the furnace is not required for baking or drying purposes, the external air may be admitted to it through a pipe, H, furnished with a suitable valve or damper, and may be discharged from the oven through pipes I, either into the room containing the stove or into an adjoining or upper room.

The products of combustion, in passing from the furnace or fire-place into the lower flue E of the room, are met by numerous small jets of air passing through perforations in a pipe, $m$, and by the aid of these jets the gases are effectually ignited and consumed.

There are in the top of the inner casing of the oven openings $n$ $n$, to which valves or dampers are adapted, so that the fumes and vapors generated in the oven may, when necessary, be permitted to escape.

At the rear of the oven is a tank, K, with which communicate circulating-pipes M, so situated within the lower flue E that they will be subjected to the direct action of the products of combustion, a circulation of water being maintained through the pipes, so that there will always be a supply of hot water in the tank, whether the oven is used separately from or in connection with the furnace. I prefer to separate the tank into two compartments, one end of the circulating-pipe communicating with one compartment and the other end of the pipe with the other compartment, so that cold water may be supplied to one and hot water derived from the other.

I provide the stove with extensive facilities for drying clothes by combining therewith holders for arms, carrying the clothes to be dried, in the following manner: At each side of the stove are vertical rods T T, which are secured to the stove so as to be readily detachable therefrom; and these rods carry, in the present instance, wooden strips W and metal strips $t$, each perforated for the reception of rods V, on which to hang the clothes to be dried. Similar arms, $q$, are adapted to a socket, $p$, at the top of the stove. The strips W and $t$ are adjusted vertically, so that, no matter what may be the length or quality of the articles of clothing hung upon the arms V, they may always be adjusted to a proper position in respect to the top of the stove.

I claim as my invention—

1. The combination of the oven with the double-chambered tank K and the circulating-pipe M, contained within the lower flue of the oven, and serving to establish the only communication between the two chambers of the tank, as and for the purpose set forth.

2. The combination of the stove and the vertical rods T, secured to the same, with the vertically-adjustable strips W $t$, adapted for the reception of clothes-drying arms V, as set forth.

In testimony whereof I have signed my name to this specification in the presence of two subscribing witnesses.

ANDREW V. CALLAHAN.

Witnesses:
HERMANN MOESSNER,
HARRY SMITH.